| United States Patent [19] | [11] Patent Number: 4,995,962 |
|---|---|
| Degnan, Jr. et al. | [45] Date of Patent: Feb. 26, 1991 |

[54] WAX HYDROISOMERIZATION PROCESS

[75] Inventors: Thomas F. Degnan, Jr., Morristown; Michael E. Landis, Woodbury, both of N.J.

[73] Assignee: Mobil Oil Corporation, Fairfax, Va.

[21] Appl. No.: 459,154

[22] Filed: Dec. 29, 1989

[51] Int. Cl.$^5$ ............................................. C10G 47/20
[52] U.S. Cl. ................................... 208/110; 208/112; 585/750/751
[58] Field of Search ................ 208/110, 112; 585/750, 585/751

[56] References Cited

U.S. PATENT DOCUMENTS

| 3,329,480 | 7/1967 | Young | 208/110 |
|---|---|---|---|
| 4,547,283 | 10/1985 | Neel et al. | 208/112 X |
| 4,600,503 | 7/1986 | Angevine et al. | 208/251 |
| 4,612,108 | 9/1986 | Angevine et al. | 208/111 |
| 4,724,066 | 2/1988 | Kirker et al. | 208/114 |

*Primary Examiner*—Curtis R. Davis
*Assistant Examiner*—William Diemler
*Attorney, Agent, or Firm*—Alexander J. McKillop; Charles J. Speciale; Edward F. Kenehan, Jr.

[57] ABSTRACT

There is provided a process for hydroisomerizing petroleum or synthetic paraffin wax with a particular catalyst. The catalyst comprises a hydrogenating component and a layered titanate containing an interspathic polymeric oxide such as silica. The hydrogenating component may be a Group VIII metal such as Pt.

6 Claims, 5 Drawing Sheets

WAX HYDROISOMERIZATION PROCESS

BACKGROUND

This application relates to a process for hydroisomerizing wax over a pillared titanate catalyst.

High viscocity index lubricating oils (i.e., VI greater than 130) are highly paraffinic. In fact, the highest viscosity index materials are pure paraffins. Thus, petroleum derived waxes have potential for producing these types of lubricants. A good description of petroleum waxes and the processes used to produce them can be found in a publication by F. Jowett, "Petroleum Waxes", in *Modern Petroleum Technology*, Part 2, ed. G. D. Hobson, 5th edition, Institute of Petroleum, John Wiley and Sons, Chichester (1984).

Long chain paraffins, and particularly linear paraffins, have the highest melting points of any hydrocarbons of equivalent molecular weight. If these paraffins are isomerized, it may be possible to obtain the desired low pour points necessary for salable high VI products.

SUMMARY

There is provided a process for hydroisomerising petroleum wax or synthetic paraffin wax, thereby reducing its pour point, said process comprising contacting said wax with a hydroisomerization catalyst under sufficient hydroisomerization conditions, said catalyst comprising a layered titanate containing interspathic polymeric oxide, said catalyst further comprising a hydrogenating component selected from the group consisting of Fe, Co, Ni, Ru, Rh, Pd, Os, Ir and Pt.

EMBODIMENTS

Paraffin isomerization is a dual functional (i.e., acid and metal) catalyzed reaction that requires a careful balancing of the metal and acid functions. For high VI lubricants, the objective is to lower the pour point of the wax while minimizing the amount of overcracking to lower molecular weight materials that are out of the lube boiling range. The hydroisomerization catalysts described herein are particularly well suited for meeting this objective.

Preferred feedstocks for the present hydroisomerization process are deoiled microcrystalline, intermediate, or paraffin waxes. Hydroprocessed or synthetic wax products (e.g., Fischer-Tropsch wax products) are especially suitable.

The hydroisomerization process uses moderate to high hydrogen pressures (200 to 3000 psig), temperatures ranging from 232° C. (450° F.) to 454° C. (850° F.), and LHSVs ranging from 0.05 to 10 hr$^{-1}$. Hydrogen circulation rates may range from 500 to 10,000 scf $H_2$/BBL.

The hydroisomerization catalyst used in the present process comprises a pillared titanate and a hydrogenation component. The hydrogenation component may be a Group VIII element, i.e., Fe, Co, Ni, Ru, Rh, Pd, Os, Ir or Pt. Such catalysts, which contain a pillared titanate and a Group VIII element, are described in U.S. Pat. No. 4,600,503, the entire disclosure of which is expressly incorporated herein by reference.

In particular, layered titanates, e.g., trititanates like $Na_2Ti_3O_7$ are useful starting materials for preparing the present hydroisomerization catalysts. The starting materials comprise an interspathic cationic species between their layers. Trititanate is a commercially available material whose structure consists of infinite anionic sheets of titanium octahedra with intercalated alkali metal cations. The layered metal oxide component contains a stable polymeric oxide, preferably silica, between adjoining layers resulting in a heat-stable material which substantially retains its interlayer distance upon calcination.

The interspathic polymeric oxides formed between the layers of the layered titanate components of the present invention are preferably oxides of elements selected from Group IV B of the Periodic Table, including silicon, germanium, tin and lead, with silicon especially prefered. The polymeric oxide precursor may be an electrically neutral, hydrolyzable compound, such as tetrapropylorthosilicate, tetramethylorthosilicate, or preferably tetraethylorthosilicate. In addition, the polymeric oxide precursor may contain zeolite precursors such that exposure to conversion conditions results in the formation of interspathic zeolite material as at least some of the polymeric oxide.

The starting layered titanate material may be treated with an organic compound capable of forming cationic species such as organophosphonium or organoammonium ion, before adding the polymeric oxide source. Insertion of the organic cation between the adjoining layers serves to separate the layers in such a way as to make the layered oxide receptive to the interlayer addition of an electrically neutral, hydrolyzable, polymeric oxide precursor. In particular, alkylammonium cations have been found useful for this purpose. $C_3$ and larger alkylammonium, e.g., n-octylammonium, is readily incorporated within the interlayer species of the layered oxides, serving to prop open the layers in such a way as to admit the polymeric oxide precursors. The extent of the interlayer spacing can be controlled by the size of the organoammonium ion employed. Indeed, the size and shape of the ammonium ion can affect whether or not the organoammonium ion can be interspathically incorporated within the layered oxide structure at all. For example, bulky cations such as tetrapropylammonium are not particularly suited to interspathic insertion between titanate layers.

The organic ammonium cation precursor may be formed by combining a precursor amine and a suitable acid, e.g., mineral acids such as hydrochloric acid. The layered titanate starting material can then be combined with the resulting aqueous solution of ammonium ion to form a layered oxide containing intercalated organic material and water. The resulting "propped" product may then be contacted with an electrically neutral, hydrolyzable polymeric oxide precursor. After hydrolysis, preferably by exposure to interspathic water, the polymeric oxide precursor forms a thermally stable polymeric oxide. A final calcination step may be employed which is severe enough to remove the organic interspathic species. Remaining organic may also be removed, if desired, by a separate chemical treatment.

The layered material catalyst can be shaped into a wide variety of particle sizes. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded, such as by extrusion, the layered material can be extruded before drying or partially dried and then extruded.

It may be desired to incorporate the layered material with another material which is resistant to the temperatures and other conditions employed in the hydroisomerization process described herein. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with layered material, i.e., combined therewith or present during its synthesis, which itself is catalytically active may change the conversion and/or selectivity of the catalyst. Inactive materials suitably serve as diluents to control the amount of conversion so that hydroisomerization products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use, it is desirble to prevent the catalyst from breakig down into powder-like materials. These clay binders have been employed normally only for the purpose of improving the crush strength of the catalyst.

Naturally occurring clays which can be composited with layered materials include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with layered materials also include inorganic oxides, notably alumina.

In addition to the foregoing materials, the layered materials can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of finely divided layered materials and inorganic oxide matrix vary widely, with the layered material content ranging from about 1 to about 90 percent by weight and more usually, particularly when the composite is prepared in the form of beads, in the range of about 2 to about 80 weight of the composite.

In the Examples which follow, when Alpha Value is reported, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078, in the *Journal of Catalysis*, Vol 4, p. 527 (1965); Vol. 6, p. 278 (1966); and Vol. 61, p. 395 (1980), each incorporated herein by reference as to that description. The experimental conditions are incorporated herein by reference as to that description. The experimental conditions of the Alpha Test preferably include a constant temperature of 538° C. and a variable flow rate as described in detail in the *Journal of Catalysis*, Vol. 61, p. 395.

EXAMPLE

All treatments in the following procedure were carried out at room temperature unless otherwise specified.

A sample of $Na_2Ti_3O_7$ was prepared by calcining an intimate mixture of 100 g of $TiO_2$ and 553 g $Na_2CO_3$ in air at 1000° C. (1832° F.) for 20 hours (heat up rate=2.8° C. (5° F.)/min). This mixture was then reground and reheated in air at 1000° C. (1832° F.) for 20 hours (heat up rate=2.8° C. (5° F.)/min). The product was stirred in 1.5 liters of water for 1 hour, filtered, dried in air at 250° F. for one hour, and calcined in air at 1000° F. for one hour. This product was slurried in 900 grams of water and ballmilled for 16 hours. The solid $Na_2Ti_3O_7$ product was filtered and dried for 24 hours.

The entire 1,194 gram batch of this ballmilled product was exchanged five times at 85°–91° C. (185°–195° F.) with a solution of 4,240 grams of 50% ammonium nitrate diluted to 10 liters with water. The solid product was filtered and washed with 20 liters of water after each exchange. This product was dried for 24 hours after the final exchange.

An 800 gram batch of the ammonium-exchanged trititanate was refluxed with stirring for 48 hours in a mixture of 800 grams of octylamine in 5,300 grams of water. Subsequently, another 800 gram aliquot of octylamine was added, and the resulting mixture was stirred at reflux for an additional 6 days and then at room temperature for 7 additional days. The solution was decanted and the solids filtered using one liter of ethanol to assist filtration. The product was washed with 20 liters of water and dried overnight. Seven hundred and fifty grams of this product was refluxed with 1,000 grams of octylamine for six hours. The mixture was cooled to less than 71° C. (160° F.), one liter of ethanol was added, and the product was filtered and dried overnight.

This dried material was reslurried in one liter of ethanol for one hour, filtered, and dried for 24 hours. The product was then refluxed in 750 grams of octylamine in a four-necked, five liter round bottom flask equipped with a Dean-Stark trap. Reaction temperature increased in a one hour interval from about 135° C. (275° F.) to about 175° C. (347° F.) as water was removed from the system via the Dean-Stark trap. The mixture was refluxed at 175° C. (347° F.) for two hours and then cooled to less than 71° C. (160° F.). One liter of ethanol was then added, and the solid product was filtered and dried overnight. The dried product was reslurried in one liter of ethanol for one hour, filtered, and dried again overnight. This product was then stirred in three liters of water for 24 hours, filtered, and dried for 42 hours. The octylammonium swollen trititanate had the following composition:

| | |
|---|---|
| TiO$_2$ | 73.1 wt % |
| C | 8.97 wt % |
| N | 2.3 wt % |
| Na | 1160 ppm |
| Ash | 77.4 wt % |

Four hundred grams of the octylammonium swollen trititanate from above was mechanically stirred with 2,700 grams of tetraethylorthosilicate in a four-necked, five liter round bottom flask equipped with nitrogen inlet and outlet lines. This mixture was stirred under a slow nitrogen purge for three days. The product was filtered and dried for 24 hours. This material was then stirred in two liters of water for 24 hours, filtered, and dried for 48 hours. The tetraethylorthosilicate treatment was repeated as described above. The product of this step, after filtration and drying, was stirred in two liters of water for 24 hours. This product was filtered, dried for 24 hours, and calcined at 510° C. (950° F.) in nitrogen for two hours at a heat-up rate of 2.8° C. (5° F.)/min. The atmosphere was then changed to air and the material was calcined for an additional one hour at 510° C. (950° F.). The final low sodium silicotitanate had the composition and physical properties shown in Table 1. This material had an Alpha Value of 1.6.

TABLE 1

| Properties of the Silicotitanate | |
|---|---|
| Surface Area, m$^2$/g | 292 |
| Sorption, g/100 g | |
| n-hexane | 8.3 |
| cyclohexane | 9.2 |
| water | 12.3 |
| Composition, wt % | |
| TiO$_2$ | 73.9 |
| SiO$_2$ | 22.7 |
| Na | 0.114 |
| Ash | 97.4 |

EXAMPLE 2

A fifteen gram sample of the pillared material described in Example 1 was Pt exchanged at room temperature with Pt(NH$_3$)$_4$Cl$_2$ by adding 0.272 grams of the Pt salt to 15 ml of deionized water and then adding the salt solution to 60 ml of deionized water into which the silicotitanate was slurried. The Pt salt solution was added over the course of 4 hours. Following the exchange, the catalyst was filtered, rinsed twice with 200 ml of deionized water, and then dried overnight at 110° C.

The dried catalyst was calcined in flowing dry air at 1° C./min to 350° C. and held at this temperature for 3 hours. Elemental analysis showed the catalyst to contain 0.99 wt % Pt. Other properties of this catalyst are given in Table 2. The catalyst was tested for its activity to hydrogenate benzene to cyclohexane at 100° C., 101 kPa. The benzene hydrogenation activity of this catalyst was determined to be 370 moles of benzene converted/mole of Pt/hr. This is a general measure of the metal activity of the catalyst.

TABLE 2

| Properties of the Pt Catalysts | | |
|---|---|---|
| | Pt/SiO$_2$—Al$_2$O$_3$ | Pt/Silicotitanate |
| Surface Area, m$^2$/g | 377 | 292 |
| Density, g/cc | | |
| Real | 2.261 | — |
| Particle | 0.937 | — |
| Pore Volume, cc/g | 0.625 | — |
| Pt, wt % | 0.88 | 0.99 |
| Benzene Hydrogenation Activity | | |
| k$_{100°C.}$* | 1046 | 369.8 |
| E$_a$, kcal/mole | 11.6 | 9.2 |
| Alpha of precursor | 1.0 | 1.6 |

*Rate of benzene hydrogenation to cyclohexane, moles of benzene/mole of Pt/hr, atm pressure, H$_2$/HC = 200, overall flow rate = 200 cc/min through a ¼ inch tube containing the catalyst.

EXAMPLE 3

A twenty gram sample of silica-alumina with comparable surface area (390 m$^2$/g) and hexane cracking activity (Alpha Value=1.0) to that of the silicotitanate was Pt exchanged and calcined using the same procedure as described in Example 2. Elemental analysis showed the catalyst to contain 0.93 wt % Pt. Other properties of this catalyst are shown in Table 2. This catalyst was tested for its activity to hydrogenate benzene to cyclohexane at 100° C., 101 kPa. The benzene hydrogenation activity of this catalyst was determined to be 1146 moles of benzene converted/mole of Pt/hr.

EXAMPLE 4

10 g of the Pt/silicotitanate catalyst from Example 2 was charged to a reactor, presulfided and used to convert a hydrotreated paraffin wax at 400 psig and 0.5 LHSV. Conversion was varied by changing temperature. The properties of the hydrotreated wax are given in Table 3. Product distributions from this run are summarized in Table 4.

TABLE 3

| Properties of the Hydrotreated Paraffin Wax | |
|---|---|
| Physical Properties | Result |
| API Gravity | 42.5 |
| Molecular Weight, avg | 372 |
| Hydrogen, wt % | 14.3 |
| Nitrogen, ppm | 6 |
| KV, 100° C., cs | 3.483 |
| KV, 300° F., cs | 1.904 |
| Melting point, °F. | 129 |
| Density at 180° F., g/cc | 0.7674 |
| Distillation, ASTM D1160 | |
| IBP, °F. | 703.4 |
| 5% | 741.2 |
| 10% | 744.4 |
| 20% | 751.4 |
| 30% | 759.7 |
| 40% | 770.1 |
| 50% | 782.7 |
| 60% | 795.9 |
| 70% | 809.4 |
| 80% | 830.6 |
| 90% | 858.9 |
| 95% | 890.2 |
| 95.5% | 894.7 |

TABLE 4

| Product Distributions from Pt/Silicotitanate Hydroisomerization of Hydrotreated Paraffin Wax | | | | |
|---|---|---|---|---|
| Reaction Temp °F. | 537.8 | 539.6 | 552.2 | 559.4 |
| WHSV. hr$^{-1}$ | 0.5 | 0.5 | 0.5 | 0.5 |

TABLE 4-continued

Product Distributions from Pt/Silicotitanate
Hydroisomerization of Hydrotreated Paraffin Wax

| Pressure, psig | 400 | 400 | 400 | 400 |
|---|---|---|---|---|
| $H_2$ circ, SCF/BBL | 2500 | 2500 | 2500 | 2500 |
| Product, wt % | | | | |
| Methane | 0.0 | 0.1 | 0.2 | 0.6 |
| Ethane | 0.1 | 0.2 | 0.6 | 1.2 |
| Ethylene | 0.0 | 0.0 | 0.0 | 0.0 |
| Propane | 0.2 | 0.3 | 1.1 | 2.5 |
| Propane | 0.0 | 0.0 | 0.0 | 0.0 |
| I-Butane | 0.5 | 0.9 | 2.8 | 6.1 |
| N-Butane | 0.2 | 0.4 | 1.2 | 2.3 |
| Butenes | 0.0 | 0.0 | 0.0 | 0.0 |
| $C_5$'s | 0.7 | 1.3 | 3.8 | 8.6 |
| $C_5$-650 | 26.1 | 41.7 | 51.1 | 72.6 |
| 650° F.+ | 72.2 | 55.1 | 39.2 | 6.1 |
| Properties of 650° F.+ Fraction | | | | |
| Pour Point, °F. | 70 | 46 | −20 | <−40 |
| Distillation, ASTM D2887 | | | | |
| IBP, °F. | 652 | 654 | 652 | 647 |
| 5% | 667 | 665 | 661 | 658 |
| 10% | 679 | 677 | 669 | 664 |
| 30% | 714 | 707 | 700 | 695 |
| 50% | 744 | 737 | 731 | 725 |
| 70% | 776 | 773 | 771 | 767 |
| 90% | 820 | 822 | 848 | 838 |
| 95% | 848 | 850 | 896 | 910 |
| End Point | 913 | 928 | 999 | 1007 |

EXAMPLE 5

10 g of the Pt/$SiO_2$—$Al_2O_3$ catalyst from Example 3 was charged to an identical reactor, presulfided, and used to convert the same hydrotreated paraffin wax at 400 psig and 0.5 LHSV. Conversion was varied by changing temperature. Product distributions from this run are summarized in Table 5.

TABLE 5

Product Distributions from Pt/$SiO_2$—$Al_2O_3$
Hydroisomerization of Hydrotreated Wax

| Reaction Temp °F. | 559.4 | 573.8 | 577.4 | 588.2 |
|---|---|---|---|---|
| WHSV, hr$^{-1}$ | 0.5 | 0.5 | 0.5 | 0.5 |
| Pressure, psig | 400 | 400 | 400 | 400 |
| $H_2$ circ, SCF/BBL | 2500 | 2500 | 2500 | 2500 |
| Product, wt % | | | | |
| Methane | 0.0 | 0.0 | 0.0 | 0.0 |
| Ethane | 0.0 | 0.0 | 0.1 | 0.0 |
| Ethylene | 0.0 | 0.0 | 0.0 | 0.0 |
| Propane | 0.6 | 1.1 | 1.3 | 1.7 |
| Propene | 0.0 | 0.0 | 0.0 | 0.0 |
| I-Butane | 1.4 | 2.8 | 3.2 | 4.4 |
| N-Butane | 0.7 | 1.5 | 1.5 | 2.1 |
| Butenes | 0.0 | 0.0 | 0.0 | 0.0 |
| $C_5$'s | 1.9 | 3.3 | 4.1 | 5.7 |
| $C_5$-650 | 21.9 | 42.0 | 48.1 | 55.1 |
| 650° F.+ | 73.5 | 49.3 | 41.7 | 31.0 |
| Properties of 650° F.+ Fraction | | | | |
| Pour Point, °F. | 80 | 41 | 17 | −10 |
| Distillation, ASTM D2887 | | | | |
| IBP, °F. | 652 | 651 | 652 | 650 |
| 5% | 669 | 668 | 658 | 659 |
| 10% | 683 | 680 | 668 | 666 |
| 30% | 724 | 717 | 700 | 694 |
| 50% | 759 | 748 | 729 | 722 |
| 70% | 801 | 782 | 762 | 755 |
| 90% | 866 | 834 | 812 | 810 |
| 95% | 890 | 860 | 838 | 838 |
| End Point | 998 | 918 | 899 | 923 |

Figure 1:
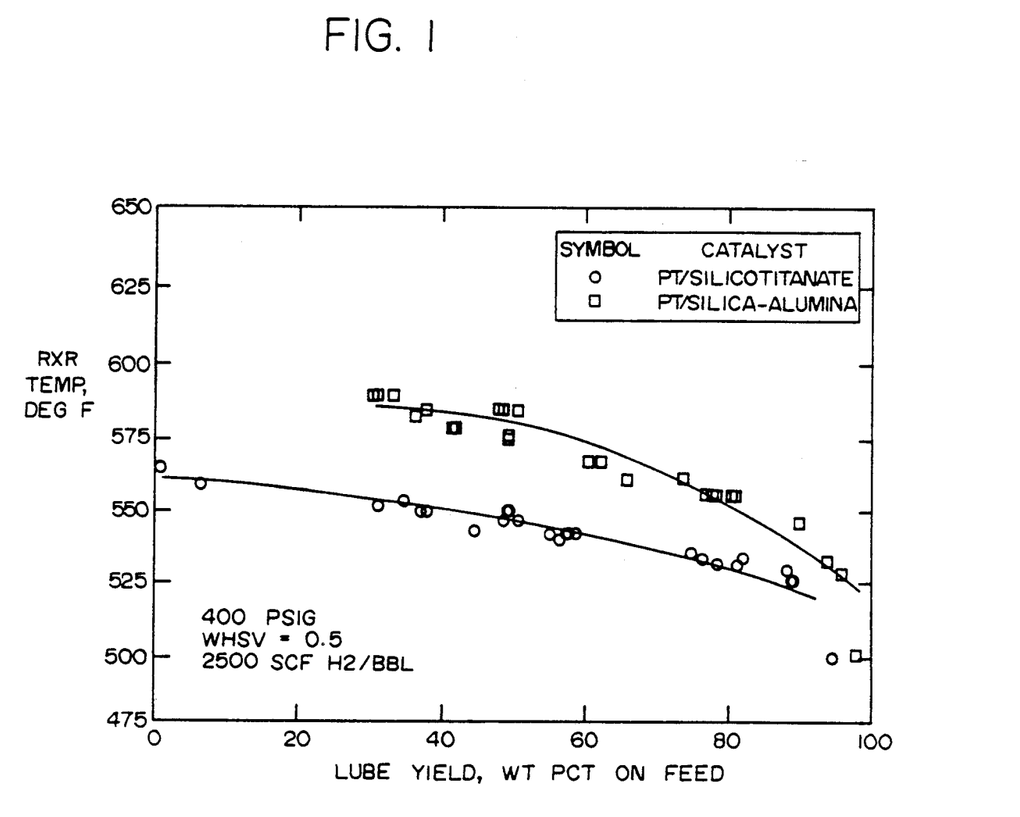
FIG. 1 is a graph showing reactor temperature vs. lube yield for two catalysts when used to hydroisomerize a petroleum wax feedstock.
Figure 2:
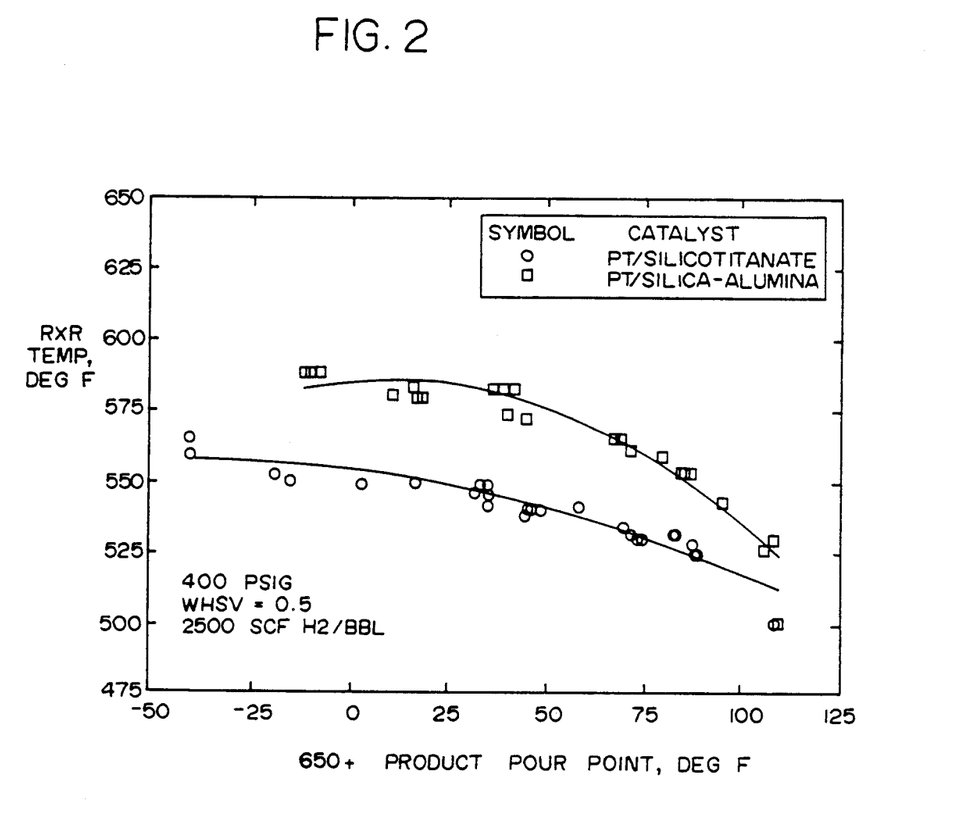
FIG. 2 is a graph showing reactor temperature vs. lube product pour point for two catalysts when used to hydroisomerize a petroleum wax feedstock.

FIG. 1 compares the activity of the two catalysts on the basis of the reactor temperature required to obtain a given pour point of the 650° F.+ fraction. This Figure shows that the Pt/Silicotitanate catalyst is approximately 25° F. more active than the Pt/$SiO_2$—$Al_2O_3$ catalyst on the same LHSV basis. FIG. 2 is a similar comparison and shows the reactor temperature required to obtain a particular 650° F.+ lube yield. Again, the conclusion is that the silicotitanate is 25° F. more active than the analogous Pt/$SiO_2$—$Al_2O_3$ catalyst.

Figure 3:
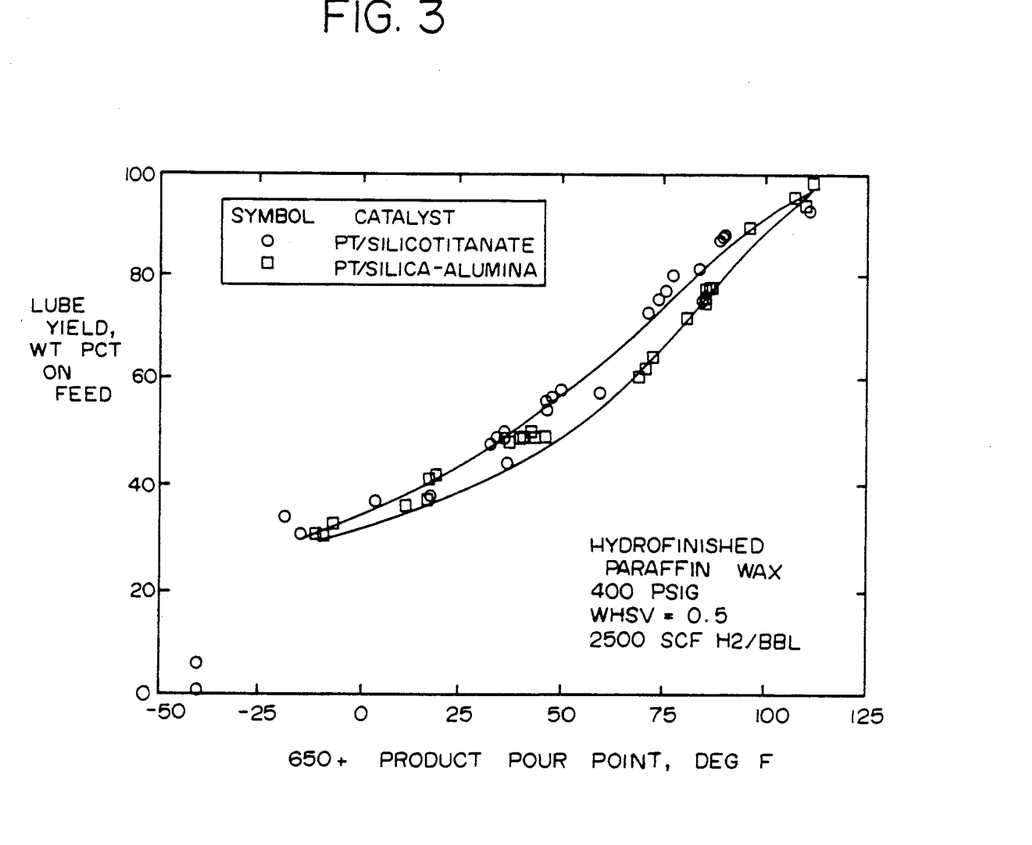
FIG. 3 is a graph showing lube yield vs. lube pour point for two catalysts when used to hydroisomerize a petroleum wax feedstock.
Figure 4:
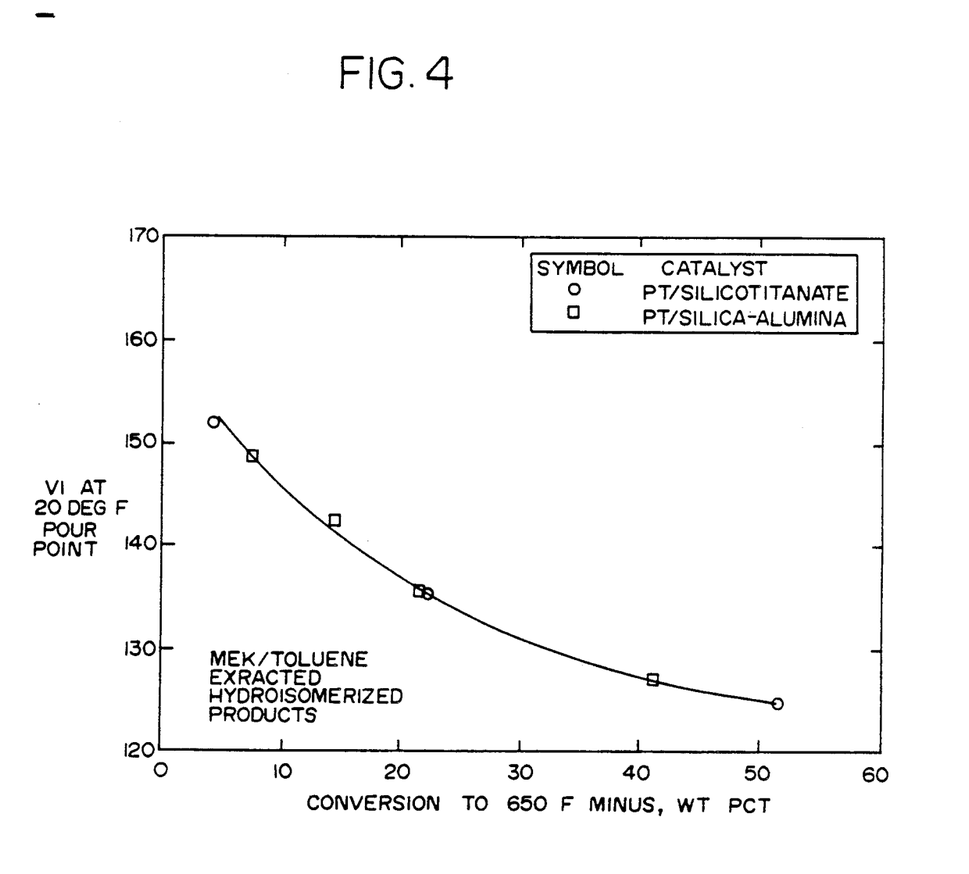
FIG. 4 is a graph showing product viscosity index vs. conversion for two catalysts when used to hydroisomerize a petroleum wax feedstock.

FIG. 3 is the lube selectivity plot and compares the lube yield at any given 650° F.+ pour point of the lube products from both runs. This plot shows that the Pt/Silicotitanate catalyst produces from 5 to 10 wt % more 650° F.+ product at a given product pour point than the Pt/$SiO_2$—$Al_2O_3$ catalyst. FIG. 4 plots the VI of the 650° F.+ lube products at a constant 20° F. pour point vs the conversion out of the lube boiling range. These data show that there is no difference in the VI vs conversion selectivities of the two catalysts. Taken together, FIGS. 1 through 4 show that the Pt/Silicotitanate produces more lube at a given pour point and is more active on an LHSV basis than the analogous Pt/$SiO_2$—$Al_2O_3$ catalyst. The product VI is independent of which catalyst is used and is only a function of conversion.

The low conversion products from both catalysts had pour points that were higher than room temperature. These materials were subsequently solvent dewaxed with a methyl ethyl ketone (MEK)/toluene solution to reduce the pour point to a give target level. The procedure involved diluting the catalytically isomerized product in a 60 vol % MEK/40 vol % toluene solution (3 parts MEK/toluene to 1 part lube), chilling the solution to −20° F., filtering the slurry on chilled vacuum funnel, and rinsing the filter cake twice with 1 ml/g of the chilled MEK/toluene solution. The extract was then vacuum distilled to obtain the solvent dewaxed product. The net yield of lube at the target 20° F. pour point was computed by subtracting the amount lost by: 1) cracking in the isomerization step, 2) solvent dewaxing with MEK/toluene, and 3) distillation of the extract.

Figure 5:
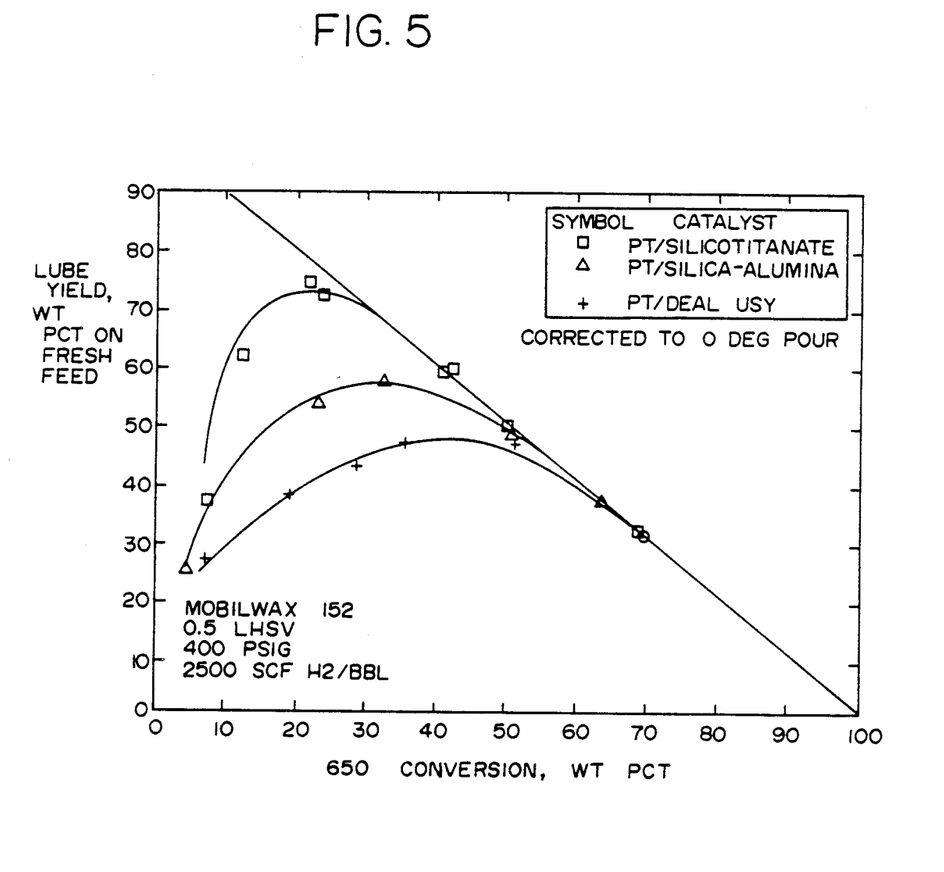
FIG. 5 is a graph showing the wt % lube yield from catalytically isomerized then solvent dewaxed products (at 0° F. pour point) vs. conversion out of the lube boiling (650° F.+) range for certain catalysts.

A plot was prepared of the wt % lube yield from these catalytically isomerized then solvent dewaxed products (at 0° F. pour point) vs conversion out of the lube boiling (650° F.+) range. This selectivity plot (FIG. 5) shows that the Pt/Silicotitanate catalyst produces as much as 10 to 15% more lube than the Pt/$SiO_2$—$Al_2O_3$ catalyst when the subsequent solvent dewaxing step is used.

The present Pt/Silicotitanate catalyst has also been compared to a Pt/dealuminized USY catalyst ($SiO_2$/$Al_2O_3$ mole ratio equal to 60) for hydroisomerization reactions. Except for conversion activity, the Pt/dealuminized USY catalyst is inferior in all respects to either of the Pt catalysts described above. The more acidic Pt/dealuminized USY catalyst (Alpha Value=3 w/o Pt) produces less 650° F.+ product at a given pour point than the Pt/Silicotitanate or the Pt/silica-alumina catalysts either by the high conversion isomerization route or by the low conversion- solvent dewaxing route.

What is claimed is:

1. A process for hydroisomerizing petroleum wax or synthetic paraffin wax, thereby reducing its pour point, said process comprising contacting said wax with a hydroisomerization catalyst under sufficient hydroisomerization conditions, said catalyst comprising a layered titanate containing interspathic polymeric oxide, said catalyst further comprising a hydrogenating component selected from the group consisting of Fe, Co, Ni, Ru, Rh, Pd, Os, Ir, and Pt.

2. A process according to claim 1, wherein said hydroisomerization conditions include a hydrogen pressure of from 200 psig to 3000 psig, a temperature of from 232° C. to 454° C., a LHSV of from 0.05 hr$^{-1}$ to 10 hr$^{-1}$ and a hydrogen circulation rate of from 500 scf H$_2$/BBL to 10,000 scf H$_2$/BBL.

3. A process according to claim 2, wherein said hydrogenating component is Pt.

4. A process according to claim 3, wherein said polymeric oxide is silica.

5. A process according to claim 1, wherein said catalyst further comprises a binder for said layered titanate.

6. A process according to claim 5, wherein said binder is alumina.

* * * * *